(12) United States Patent
Shahsavari et al.

(10) Patent No.: US 10,236,725 B1
(45) Date of Patent: Mar. 19, 2019

(54) WIRELESS CHARGING SYSTEM WITH IMAGE-PROCESSING-BASED FOREIGN OBJECT DETECTION

(71) Applicant: Apple Inc., Cupertino, CA (US)

(72) Inventors: Behrooz Shahsavari, Hayward, CA (US); Weiyu Huang, Santa Clara, CA (US); Sneha Kadetotad, Cupertino, CA (US); Baboo V. Gowreesunker, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/875,418

(22) Filed: Jan. 19, 2018

Related U.S. Application Data

(60) Provisional application No. 62/554,453, filed on Sep. 5, 2017.

(51) Int. Cl.
*H01M 10/46* (2006.01)
*H02J 50/12* (2016.01)
*H02J 50/60* (2016.01)
*H02J 50/40* (2016.01)
*H02J 7/02* (2016.01)
(Continued)

(52) U.S. Cl.
CPC ............ *H02J 50/12* (2016.02); *H02J 7/0027* (2013.01); *H02J 7/025* (2013.01); *H02J 7/045* (2013.01); *H02J 50/40* (2016.02); *H02J 50/60* (2016.02); *H02J 50/80* (2016.02)

(58) Field of Classification Search
CPC .......... H02J 7/025; H02J 7/0042; H02J 7/355; H02J 50/10; H02J 50/60; H02J 50/80; B60L 11/182; H01F 38/14

USPC ................ 320/107, 108, 114, 115, 116, 122; 307/104
See application file for complete search history.

(56) References Cited

U.S. PATENT DOCUMENTS 8,587,154 B2  11/2013  Fells et al.
9,209,627 B2  12/2015  Baarman et al.
(Continued)

FOREIGN PATENT DOCUMENTS

CN      106685029 A    5/2017
KR   10-2009-0065648 A  6/2009
(Continued)

*Primary Examiner* — Edward Tso
(74) *Attorney, Agent, or Firm* — Treyz Law Group, P.C.; Joseph F. Guihan

(57) ABSTRACT

A wireless power transmission system has a wireless power receiving device with a wireless power receiving coil that is located on a charging surface of a wireless power transmitting device with a wireless power transmitting coil array. Control circuitry in the wireless power transmitting device may use inverter circuitry to supply alternating-current signals to coils in the coil array, thereby transmitting wireless power signals. The control circuitry may also be used to detect foreign objects on the coil array such as metallic objects without wireless power receiving coils. For example, control circuitry may use inductance measurements from the coils in the coil array to identify segments of the coil array that correspond to potential wireless power receiving devices. The control circuitry may control wireless power transmission based on a comparison between the number of identified segments corresponding to potential wireless power receiving devices and a number of received device-identifiers.

20 Claims, 6 Drawing Sheets

(51) Int. Cl.
*H02J 7/00* (2006.01)
*H02J 7/04* (2006.01)
*H02J 50/80* (2016.01)

(56) References Cited

U.S. PATENT DOCUMENTS

| | | | |
|---|---|---|---|
| 9,236,757 B2 | 1/2016 | Walley et al. | |
| 9,722,449 B2 | 8/2017 | Jung | |
| 2009/0096413 A1* | 4/2009 | Partovi | H01F 5/003 |
| | | | 320/108 |
| 2012/0313577 A1* | 12/2012 | Moes | H02J 7/025 |
| | | | 320/108 |
| 2013/0119928 A1 | 5/2013 | Partovi | |
| 2016/0043567 A1 | 2/2016 | Matsumoto et al. | |
| 2016/0064994 A1 | 3/2016 | Ku et al. | |
| 2016/0134154 A1 | 5/2016 | Baarman et al. | |
| 2018/0034326 A1* | 2/2018 | Abdolkhani | H02J 50/10 |

FOREIGN PATENT DOCUMENTS

| | | |
|---|---|---|
| WO | 2013055192 A1 | 4/2013 |
| WO | 2015144389 A1 | 10/2015 |
| WO | 2016050424 A1 | 4/2016 |

\* cited by examiner

WIRELESS CHARGING SYSTEM WITH IMAGE-PROCESSING-BASED FOREIGN OBJECT DETECTION

This application claims the benefit of provisional patent application No. 62/554,453, filed on Sep. 5, 2017, which is hereby incorporated by reference herein in its entirety.

FIELD

This relates generally to power systems, and, more particularly, to wireless power systems for charging devices.

BACKGROUND

In a wireless charging system, a wireless charging mat wirelessly transmits power to an electronic device that is placed on the mat. The electronic device has a receiving coil and rectifier circuitry for receiving wireless alternating-current (AC) power from a coil in the wireless charging mat that is in the proximity of the receiving coil. The rectifier converts the received AC power into direct-current (DC) power. When there is a foreign object on the mat, the mat control circuitry may take suitable actions to prevent undesirable heating.

SUMMARY

A wireless power transmission system has a wireless power receiving device that is located on a charging surface of a wireless power transmitting device. The wireless power receiving device has a wireless power receiving coil and the wireless power transmitting device has a wireless power transmitting coil array. Control circuitry may use inverter circuitry in the wireless power transmitting device to supply alternating-current signals to coils in the coil array, thereby transmitting wireless power signals.

Signal measurement circuitry coupled to the coil array may make measurements while the control circuitry uses the inverter circuitry to apply excitation signals to each of the coils. The control circuitry can analyze measurements made with the signal measurement circuitry to determine the values of inductances and other measurements associated with the coils in the coil array.

Foreign objects on the coil array such as metallic objects without wireless power receiving coils can be detected using image-processing-based foreign object detection. For example, control circuitry may use inductance measurements and other measurements from the coils in the coil array to identify valid segments of the coil array that correspond to potential wireless power receiving devices. The wireless power transmitting device may also receive device-identifiers from wireless power receiving devices present on the power transmitting device. The control circuitry may determine the valid segments based on the expected shape, size, orientation, inductance, and other topological and magnetic characteristics of the wireless power receiving device.

The control circuitry may compare the number of identified segments corresponding to potential wireless power receiving devices to the number of received device-identifiers. In response to detecting that there are more identified segments than received device-identifiers, wireless power transmission operations can be blocked to prevent undesirable heating of the foreign objects or other suitable action can be taken. In response to detecting that the number of identified segments matches the number of received device-identifiers, wireless power transmission operations can be performed or other suitable action can be taken.

DETAILED DESCRIPTION

A wireless power system may have a wireless power transmitting device such as wireless charging mat. The wireless power transmitting device may wirelessly transmit power to a wireless power receiving device such as a wristwatch, cellular telephone, tablet computer, laptop computer, electric vehicle, or other electronic device. The wireless power receiving device may use power from the wireless power transmitting device for powering the device and for charging an internal battery.

Figure 1:
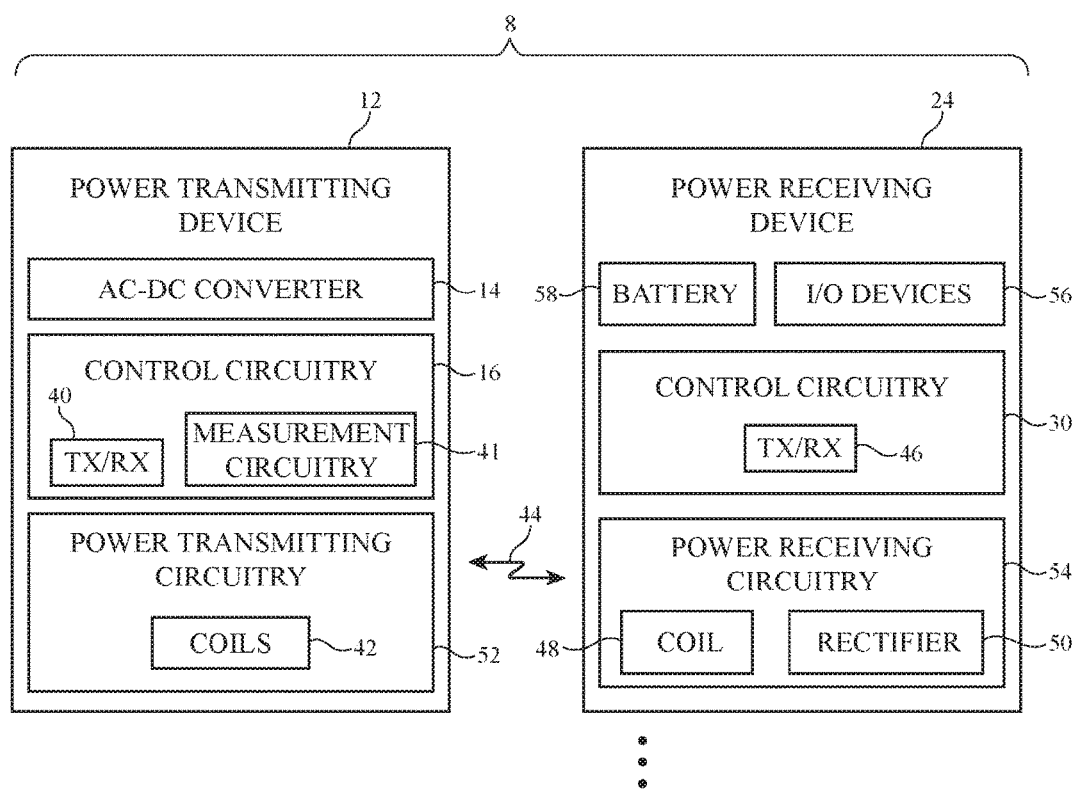
FIG. 1 is a schematic diagram of an illustrative wireless charging system that includes a wireless power transmitting device and a wireless power receiving device in accordance with an embodiment.

An illustrative wireless power system (wireless charging system) is shown in FIG. 1. As shown in FIG. 1, wireless power system 8 may include a wireless power transmitting device such as wireless power transmitting device 12 and may include a wireless power receiving device such as wireless power receiving device 24. Wireless power transmitting device 12 may include control circuitry 16. Wireless power receiving device 24 may include control circuitry 30. Control circuitry in system 8 such as control circuitry 16 and control circuitry 30 may be used in controlling the operation of system 8. This control circuitry may include processing circuitry associated with microprocessors, power management units, baseband processors, digital signal processors, microcontrollers, and/or application-specific integrated circuits with processing circuits. This processing circuitry implements desired control and communications features in devices 12 and 24. For example, the processing circuitry may be used in determining power transmission levels, processing sensor data, processing user input, handling negotiations between devices 12 and 24, sending and receiving in-band and out-of-band data packets, and processing other information and using this information to adjust the operation of system 8.

Control circuitry in system 8 may be configured to perform operations in system 8 using hardware (e.g., dedicated hardware or circuitry), firmware and/or software. Software code for performing operations in system 8 is stored on non-transitory computer readable storage media (e.g., tangible computer readable storage media) in control circuitry 8. The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, or the like. Software stored on the non-transitory computer readable storage media may be executed on the processing circuitry of control circuitry 16 and/or 30. The processing circuitry may include application-specific integrated circuits with processing circuitry, one or more microprocessors, a central processing unit (CPU) or other processing circuitry.

Power transmitting device 12 may be a stand-alone power adapter (e.g., a wireless charging mat that includes power adapter circuitry), may be a wireless charging mat that is coupled to a power adapter or other equipment by a cable, may be a portable device, may be equipment that has been incorporated into furniture, a vehicle, or other system, or may be other wireless power transfer equipment. Illustrative configurations in which wireless power transmitting device 12 is a wireless charging mat may sometimes be described herein as an example.

Power receiving device 24 may be a portable electronic device such as a wristwatch, a cellular telephone, a laptop computer, a tablet computer, or other equipment. Power transmitting device 12 may be coupled to a wall outlet (e.g., alternating current), may have a battery for supplying power, and/or may have another source of power. Power transmitting device 12 may have an AC-DC power converter such as power converter 14 for converting AC power from a wall outlet or other power source into DC power. DC power may be used to power control circuitry 16. During operation, a controller in control circuitry 16 may use power transmitting circuitry 52 to transmit wireless power to power receiving circuitry 54 of device 24. Power transmitting circuitry 52 may have switching circuitry (e.g., an inverter formed from transistors) that is turned on and off based on control signals provided by control circuitry 16 to create AC current signals through one or more coils 42. Coils 42 may be arranged in a planar coil array (e.g., in configurations in which device 12 is a wireless charging mat).

As the AC currents pass through one or more coils 42, alternating-current electromagnetic fields (signals 44) are produced that are received by one or more corresponding coils such as coil 48 in power receiving device 24. When the alternating-current electromagnetic fields are received by coil 48, corresponding alternating-current currents are induced in coil 48. Rectifier circuitry such as rectifier 50, which contains rectifying components such as synchronous rectification metal-oxide-semiconductor transistors arranged in a bridge network, converts received AC signals (received alternating-current signals associated with electromagnetic signals 44) from coil 48 into DC voltage signals for powering device 24.

The DC voltages produced by rectifier 50 can be used in powering a battery such as battery 58 and can be used in powering other components in device 24. For example, device 24 may include input-output devices 56 such as a display, touch sensor, communications circuits, audio components, sensors, and other components and these components may be powered by the DC voltages produced by rectifier 50 (and/or DC voltages produced by battery 58).

Device 12 and/or device 24 may communicate wirelessly using in-band or out-of-band communications. Device 12 may, for example, have wireless transceiver circuitry 40 that wirelessly transmits out-of-band signals to device 24 using an antenna. Wireless transceiver circuitry 40 may be used to wirelessly receive out-of-band signals from device 24 using the antenna. Device 24 may have wireless transceiver circuitry 46 that transmits out-of-band signals to device 12. Receiver circuitry in wireless transceiver 46 may use an antenna to receive out-of-band signals from device 12.

Wireless transceiver circuitry 40 uses one or more coils 42 to transmit in-band signals to wireless transceiver circuitry 46 that are received by wireless transceiver circuitry 46 using coil 48. Any suitable modulation scheme may be used to support in-band communications between device 12 and device 24. With one illustrative configuration, frequency-shift keying (FSK) is used to convey in-band data from device 12 to device 24 and amplitude-shift keying (ASK) is used to convey in-band data from device 24 to device 12. Power is conveyed wirelessly from device 12 to device 24 during these FSK and ASK transmissions.

During wireless power transmission operations, circuitry 52 supplies AC drive signals to one or more coils 42 at a given power transmission frequency. The power transmission frequency may be, for example, a predetermined frequency of about 125 kHz, at least 80 kHz, at least 100 kHz, less than 500 kHz, less than 300 kHz, or other suitable wireless power frequency. In some configurations, the power transmission frequency may be negotiated in communications between devices 12 and 24. In other configurations, the power transmission frequency is fixed.

During wireless power transfer operations, while power transmitting circuitry 52 is driving AC signals into one or more of coils 42 to produce signals 44 at the power transmission frequency, wireless transceiver circuitry 40 uses FSK modulation to modulate the power transmission frequency of the driving AC signals and thereby modulate the frequency of signals 44. In device 24, coil 48 is used to receive signals 44. Power receiving circuitry 54 uses the received signals on coil 48 and rectifier 50 to produce DC power. At the same time, wireless transceiver circuitry 46 uses FSK demodulation to extract the transmitted in-band data from signals 44. This approach allows FSK data (e.g., FSK data packets) to be transmitted in-band from device 12 to device 24 with coils 42 and 48 while power is simultaneously being wirelessly conveyed from device 12 to device 24 using coils 42 and 48.

In-band communications between device 24 and device 12 use ASK modulation and demodulation techniques. Wireless transceiver circuitry 46 transmits in-band data to device 12 by using a switch (e.g., one or more transistors in transceiver 46 that are coupled coil 48) to modulate the impedance of power receiving circuitry 54 (e.g., coil 48). This, in turn, modulates the amplitude of signal 44 and the amplitude of the AC signal passing through coil(s) 42. Wireless transceiver circuitry 40 monitors the amplitude of the AC signal passing through coil(s) 42 and, using ASK demodulation, extracts the transmitted in-band data from these signals that was transmitted by wireless transceiver circuitry 46. The use of ASK communications allows ASK data bits (e.g., ASK data packets) to be transmitted in-band from device 24 to device 12 with coils 48 and 42 while power is simultaneously being wirelessly conveyed from device 12 to device 24 using coils 42 and 48.

Control circuitry 16 has external object measurement circuitry 41 (sometimes referred to as foreign object detection circuitry or external object detection circuitry) that detects external objects on a charging surface associated with device 12. Circuitry 41 can detect wireless power receiving devices 24 with at least one wireless power receiving coil that are capable of communicating with and/or receiving power from power transmitting device 12. Wireless power receiving devices with at least one wireless power receiving coil that are capable of communicating with and/or receiving power from power transmitting device 12 may sometimes be referred to as supported devices or compatible devices. Circuitry 41 may also detect unsupported or incompatible electronic devices (i.e., electronic devices that are not operable to wirelessly receive power from power transmitting device 12) and objects such as coins, keys, paper clips, and other metallic objects that may potentially be undesirably heated. For simplicity, incompatible electronic devices and other metallic objects such as coins, keys, and paper clips may all be referred to as foreign objects.

In an illustrative arrangement, measurement circuitry 41 of control circuitry 16 contains signal generator circuitry (e.g., oscillator circuitry for generating AC probe signals at one or more probe frequencies, a pulse generator, etc.) and signal detection circuitry (e.g., filters, analog-to-digital converters, impulse response measurement circuits, etc.). During measurement operations, switching circuitry in device 12 may be adjusted by control circuitry 16 to switch each of coils 42 into use. As each coil 42 is selectively switched into use, control circuitry 16 uses the signal generator circuitry of signal measurement circuitry 41 to apply an excitation signal (sometimes referred to as an impulse signal or probe signal) to that coil while using the signal detection circuitry of signal measurement circuitry 41 to measure a corresponding response. Measurement circuitry in control circuitry 30 and/or in control circuitry 16 may also be used in making current and voltage measurements.

The characteristics of each coil 42 depend on whether any objects overlap that coil and also depend on whether a wireless power receiving device with a coil such as coil 48 of FIG. 1 is present, which could change the measured inductance of any overlapped or nearby coil 42. Signal measurement circuitry 41 is configured to measure signals at the coil while supplying the coil with signals at one or more frequencies (to measure coil inductances), signal pulses (e.g., so that measurement circuitry in the measurement circuitry can be used to make inductance and Q factor measurements), etc. Using measurements from measurement circuitry 41, the wireless power transmitting device determines whether an external object is present on the coils. If, for example, all of coils 42 exhibit their expected nominal response to the applied signals, control circuitry 16 can conclude that no external devices are present. If one of coils 42 exhibits a different response (e.g., a response varying from a normal no-objects-present baseline), control circuitry 16 can conclude that an external object (potentially a compatible wireless power receiving device) is present.

Figure 2:
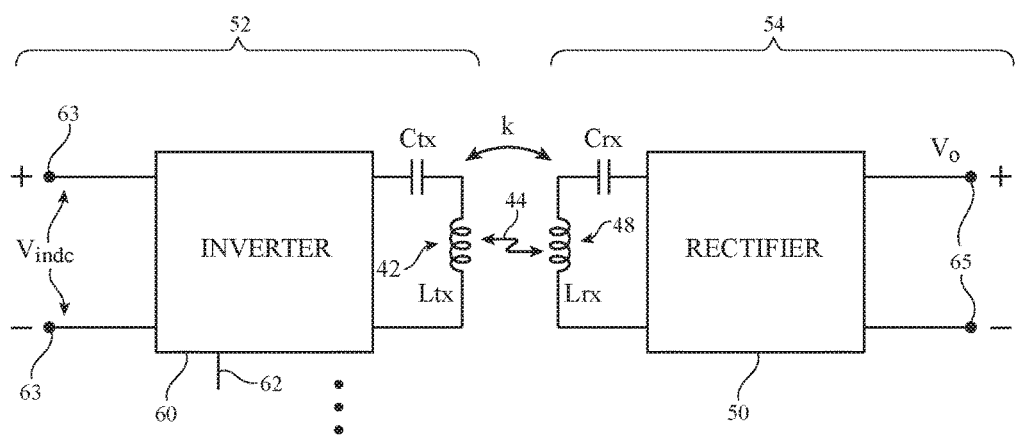
FIG. 2 is a circuit diagram of illustrative wireless power transmitting circuitry and illustrative wireless power receiving circuitry in accordance with an embodiment.

Illustrative circuitry of the type that may be used for forming power transmitting circuitry 52 and power receiving circuitry 54 of FIG. 1 is shown in FIG. 2. As shown in FIG. 2, power transmitting circuitry 52 may include drive circuitry (inverter circuitry) for supplying alternating-current drive signals to coils 42. With one illustrative configuration, the inverter circuitry includes multiple inverter circuits such as inverter 60 of FIG. 2 each of which is controlled by control circuitry 16 of device 12 and each of which is coupled to a respective one of coils 42.

Magnetic coupling coefficient k represents the amount of magnetic coupling between transmitting and receiving coils in system 8. Wireless power transfer efficiency scales with k, so optimum charging (e.g., peak efficiency) may be obtained by evaluating the coupling coefficient k for each coil and choosing appropriate coil(s) to use in transmitting wireless power to device 24 based on the coupling coefficients. After coupling coefficients k have been determined for each coil 42, control circuitry 16 can switch appropriate coil(s) 42 into use by selecting corresponding inverters 60 to use in driving signals into the coils.

Each inverter 60 has metal-oxide-semiconductor transistors or other suitable transistors. These transistors are modulated by an AC control signal from control circuitry 16 (FIG. 1) that is received on control signal input 62. The AC control signal controls modulate the transistors so that direct-current power (input voltage Vindc across direct-current power supply input terminals 63) is converted into a corresponding AC drive signal applied to coil 42 (having a self-inductance of Ltx) via its associated capacitor Ctx. This produces electromagnetic signals 44 (magnetic fields), which are electromagnetically (magnetically) coupled into coil 48 in wireless power receiving device 54.

The degree of electromagnetic (magnetic) coupling between coils 42 and 48 is represented by magnetic coupling coefficient k. Signals 44 are received by coil 48 (having a self-inductance of Lrx). Coil 48 and capacitor Crx are coupled to rectifier 50. During operation, the AC signals from coil 48 that are produced in response to received signals 44 are rectified by rectifier 50 to produce direct-current output power (e.g., direct-current rectifier output voltage Vo) across output terminals 65. Terminals 65 may be coupled to the load of power receiving device 24 (e.g., battery 58 and other components in device 24 that are being powered by the direct-current power supplied from rectifier 50).

The inductance Ltx of each coil 42 is influenced by magnetic coupling with external objects, so measurements of inductance Ltx for one or more of coils 42 in device 12 at various frequencies can reveal information on objects on power transmitting device 12. To conserve power, device 12 may be operated in a standby mode while awaiting use to supply wireless power to devices 8. Signal measurement circuitry 41 may monitor for the presence of external objects during standby. To probe a selected coil for changes in inductance Ltx due to external objects, an alternating-current probe signal (e.g., a sine wave, square wave, etc.) at a probe frequency may be produced. The inductance Ltx may then be derived based on the known value of Ctx and the frequency of the impulse response signal. The value of quality factor Q may be derived from L and the measured decay of the impulse response signal. Coupling factor k may be determined based on the output voltage of rectifier 50 (Vo), transmit coil inductance Ltx, receive coil inductance Lrx, known capacitance Ctx, and other factors.

If the measured value of Ltx for a given coil matches the normal Ltx value expected for each of coils 42 in the array of coils 42, control circuitry 16 can conclude that no external object suitable for wireless charging is present. If a given measured value of Ltx is different (e.g., larger) from that expected for an unloaded coil, control circuitry 42 can conclude that an external object is present and can perform additional measurement operations.

Figure 3:
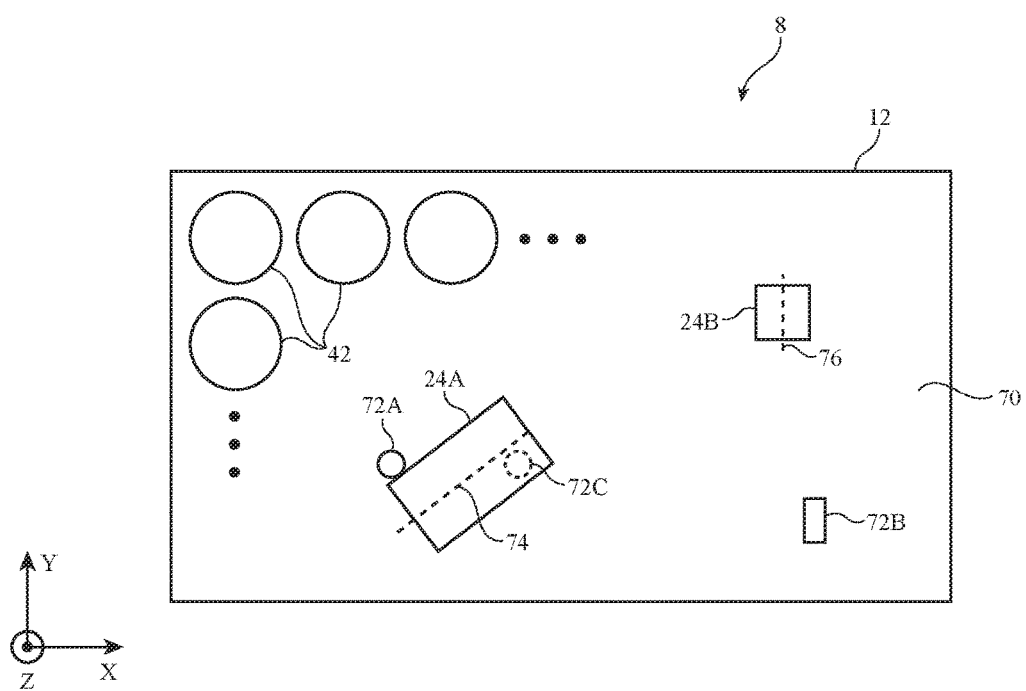
FIG. 3 is a top view of an illustrative wireless power transmitting device on which multiple wireless power receiving devices and multiple foreign objects have been placed in accordance with an embodiment.

A top view of an illustrative configuration for device 12 in which device 12 has an array of coils 42 is shown in FIG. 3. Device 12 may, in general, have any suitable number of coils 42 (e.g., 22 coils, at least 5 coils, at least 10 coils, at least 15 coils, fewer than 30 coils, fewer than 50 coils, etc.). Coils 42 of device 12 may be covered by a planar dielectric structure such as a plastic member or other structure forming charging surface 70. The lateral dimensions (X and Y dimensions) of the array of coils 42 in device 12 may be 1-1000 cm, 5-50 cm, more than 5 cm, more than 20 cm, less than 200 cm, less than 75 cm, or other suitable size. Coils 42 may overlap or may be arranged in a non-overlapping configuration. In a non-overlapping configuration, the coils may be arranged in a single layer (e.g., in a plane parallel to the XY-plane) such that no part of any coil overlaps any of the other coils in the layer. Alternatively, in an overlapping arrangement, coils 42 may be organized in multiple layers. Within each layer, the coils do not overlap. However, coils in one layer may overlap coils in one or more other layers (e.g., when viewed from above the outline of a given coil in a given layer may intersect the outline of a coil in another layer). In one illustrative example, the device may have three layers of coils (e.g., a lower layer having eight coils, a middle layer having seven coils, and an upper layer having seven coils). In general, each layer may have any suitable number of coils (e.g., at least 2 coils, at least 5 coils, fewer than 9 coils, fewer than 14 coils, 6-9 coils, etc.). Device 12 may have one layer of coils, at least two layers of coils, at least three layers of coils, at least four layers of coils, fewer than five layers of coils, 4-6 layers of coils, etc. Coils 42 can be placed in a rectangular array having rows and columns and/or may be tiled using a hexagonal tile pattern or other pattern.

A user of system 8 may sometimes place one or more wireless power receiving devices on device 12. For example, a user may place power receiving devices 24A and 24B (and, if desired, one or more additional devices) on device 12. Foreign objects 72A, 72B, and 72C such as coins, keys, paper clips, scraps of metal foil, and/or other foreign metallic objects may also be present on surface 70. If coils 42 are used to transmit wireless power signals while foreign objects such as foreign objects 72A, 72B, and 72C are present, eddy currents may be induced in the foreign objects. These eddy currents have the potential to undesirably heat the foreign objects. The foreign objects may include sensitive electronic equipment that could be potentially damaged upon exposure to fields from coils 42.

To avoid undesired heating of foreign objects, system 8 automatically detects whether objects located on surface 70 correspond to supported devices (e.g., supported power receiving devices such as devices 24A and 24B) or incompatible foreign objects (e.g., metallic objects without wireless power receiving coils such as objects 72A, 72B, and 72C) and takes suitable action. When an object is detected on charging surface 70 (i.e., by measuring inductance values of the coils), system 8 may attempt to determine if the object is a supported power receiving device using in-band communication. Sufficient power may be provided using coils 42 to enable in-band communication. If in-band communication is not established or it is determined that the object is not a compatible power receiving device, the coils will not begin wireless charging. If, however, one or more compatible wireless power receiving devices 24 are detected, it may be desirable to transfer wireless power to power receiving devices 24 using power transmitting device 12.

Even if a compatible wireless power receiving device is detected, power transmitting device 12 may not begin to transmit wireless power until determining that no foreign objects are present on the power transmitting device. If a foreign object is present on charging surface 70, wireless power transfer may be prevented (even though it is otherwise desirable to transmit wireless power to compatible device(s) 24). Steps may therefore be taken by system 8 to determine if a foreign object is present before beginning wireless charging. For example, system 8 may perform image-processing-based foreign object detection (sometimes referred to as far-field foreign object detection) to detect foreign objects that are not under wireless power receiving devices and may perform machine-learning-based foreign object detection (sometimes referred to as near-field foreign object detection) to detect foreign objects that are adjacent to or under wireless power receiving devices.

As shown in FIG. 3, foreign objects 72A and 72B are examples of a foreign object that can be detected using image-processing-based foreign object detection. In image-processing-based foreign object detection, inductance (and, optionally, quality factor Q, coupling factor k, and any other type of measurement related to the magnetic response to the excitation signal emitted by the wireless power transmitting device of objects on the wireless power transmitting device) from each coil in the array may be examined. In-band communication may be used for wireless power transmitting device 12 to receive a device-identifier from each wireless power receiving device on the charging surface. For example, wireless power receiving device 24A may send a device-identifier identifying device 24A as a cellular telephone to device 12, whereas wireless power receiving device 24B may send a device-identifier identifying device 24B as a watch to device 12. Each wireless power receiving device may have a characteristic pattern of inductance measurements (and/or quality factors and coupling factors) when the device is present on the charging surface. For example, the cellular telephone (24A) may have a different characteristic pattern of inductance measurements than the watch (24B). Upon receiving a device identifier, the wireless power transmitting device 12 may compare the known characteristic pattern of inductance measurements of the wireless power receiving device to the present inductance measurements from the coils 42. If inductance measurements (i.e., inductance measurements corresponding to foreign object 72B) are present that do not correspond to a characteristic pattern from one of the known wireless power receiving devices present, it may be interpreted that a foreign object is present on the charging surface.

Figure 4:
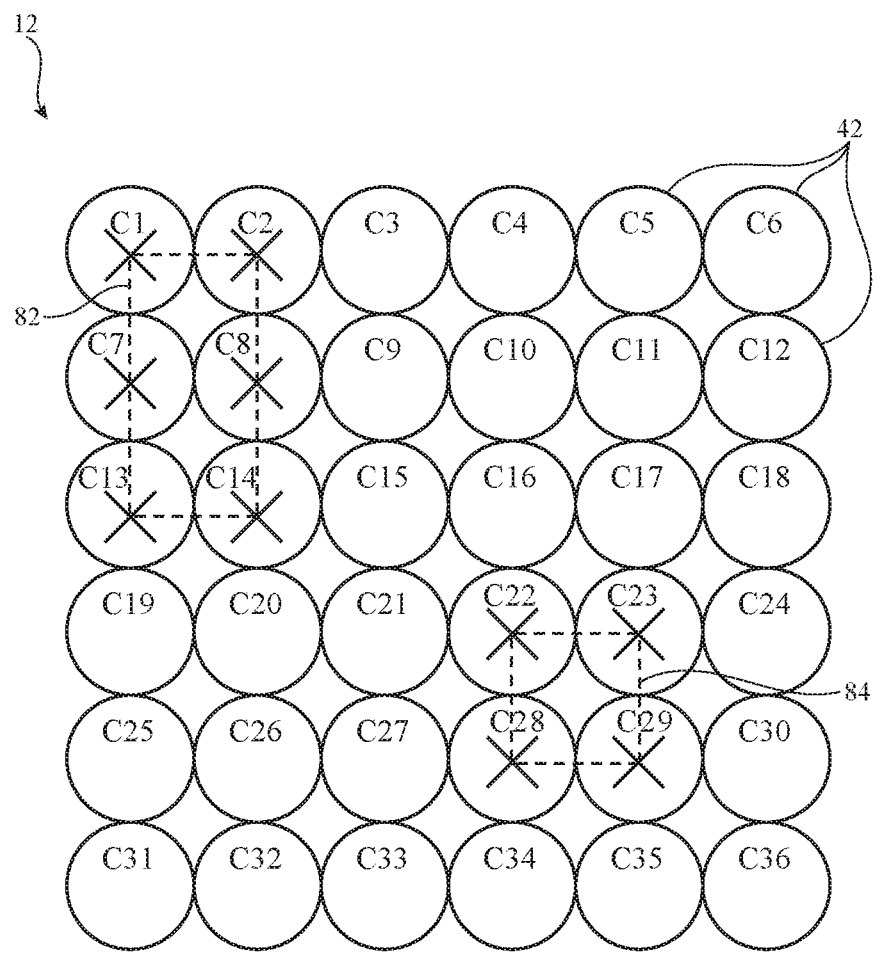
FIG. 4 is a top view of an illustrative wireless power transmitting device on which multiple wireless power receiving devices are present in accordance with an embodiment.

For example, the wireless power transmitting device in FIG. 4 may apply an excitation signal and capture the response of all objects on top of it in terms of inductance, quality factor and coupling factor. In this case, the total response can be interpreted as a 6×6 pixel and 3-channel image (because the coil array in FIG. 4 is on a 6×6 grid and each coil has three measurements that correspond to inductance, quality factor, and coupling factor). Image-processing techniques, such as segmentation, can be applied to these types of (magnetic) images to detect valid segments for supported wireless power receiving devices and foreign objects. A valid segment for a wireless power receiving device should meet a set of criteria related but not limited to the receiver shape, size, inductance and other topological and magnetic characteristics. In the example of FIG. 3, the corresponding (magnetic) image for FIG. 3 may show 4 segments: one associated with foreign object 72B, one associated with receiver 24B, one associated with receiver 24A and finally a small segment associated with foreign object 72A.

Image-processing-based foreign object detection may be used to identify foreign objects that are separated from supported wireless power receiving devices by a minimum distance (i.e., 15 millimeters, 20 millimeters, 25 millimeters, 30 millimeters, 35 millimeters, between 25 and 30 millimeters, more than 20 millimeters, more than 25 millimeters, more than 10 millimeters, less than 50 millimeters, etc.). Foreign objects that are too close to wireless power receiving devices (i.e., closer than 25 to 30 millimeters, for example) or under wireless power receiving devices (e.g., foreign object 72C) may have corresponding inductance measurement changes that are difficult to detect due to the presence of the adjacent wireless power receiving device. For example, considering the example of FIG. 3, wireless power receiving device 24A may have corresponding inductance measurements. The inductance measurements associated with foreign object 72C may be difficult to distinguish from the inductance measurements associated with device 24A. A coil beneath foreign object 72C and device 24A may have an inductance measurement that is different from that expected for an unloaded coil (indicating the presence of an external object). However, the measured inductance may include contributions from both the foreign object 72C and the device 24A. The inductance associated with foreign object 72C is therefore difficult to identify, making it hard to detect the presence of foreign object 72C.

Machine-learning-based foreign object detection (sometimes referred to as near-field foreign object detection) may be used to detect foreign objects that are in close proximity to wireless power receiving devices on the charging surface. Machine-learning-based foreign object detection may include using a machine learning classifier to determine a probability value indicative of whether a foreign object is present on the charging surface. The probability value may be determined using inductance measurements, quality factors, coupling factors, and other desired measurements from coils 42. Machine-learning-based foreign object detection may be used to detect foreign objects such as foreign objects 72A and 72C that are in close proximity to a wireless power receiving device on the charging surface.

Device 24A in the example of FIG. 3 is characterized by longitudinal axis 74 that may be oriented at any angle with respect to horizontal axis X (e.g., an angle of 0-360°). Similarly, device 24B is characterized by a longitudinal axis 76 that may be oriented at any angle with respect to horizontal axis X (e.g., an angle of 0-360°). Inductance measurements associated with the wireless power receiving devices may depend both on the angle of the longitudinal axis of the power receiving device relative to the X-axis (sometimes referred to as orientation) and the position of the power receiving device within the XY-plane. For example, the position of wireless power receiving device 24A on charging surface 70 may influence the inductance measurements by coils 42 associated with the wireless power receiving device. Additionally, at any given position within the XY plane, the orientation of device 24A may further influence the inductance measurements by coils 42 associated with the wireless power receiving device (e.g., if longitudinal axis 74 is aligned with the X-axis the inductance measurements will be different than if longitudinal axis is aligned with the Y-axis).

Figure 5:
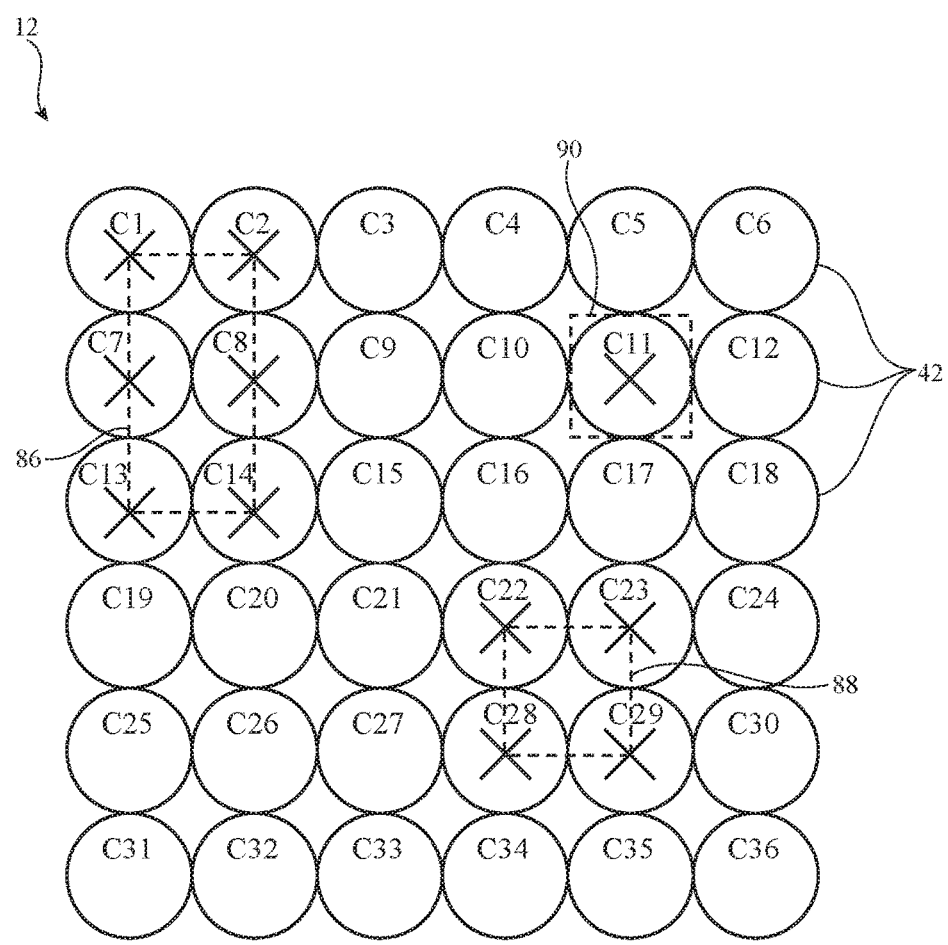
FIG. 5 is a top view of an illustrative wireless power transmitting device on which multiple wireless power receiving devices and a foreign object are present in accordance with an embodiment.

FIGS. 4 and 5 are top views of an illustrative wireless power transmitting device. In the example of FIGS. 4 and 5, wireless power transmitting device 12 includes 36 coils (C1-C36) arranged in a 6×6 grid. However, this example is merely illustrative and device 12 may include any number of coils in any desired arrangement (as previously discussed in connection with FIG. 3). FIGS. 4 and 5 show illustrative inductance measurements associated with coils 42. The inductance measurements of FIGS. 4 and 5 illustrate how image-processing-based foreign object detection may be used to detect foreign objects on the charging surface of device 12.

As shown in FIG. 4, coils 42 with inductance measurements different from the inductance measurement expected for an unloaded coil are marked with an 'x'. Coils with inductance measurements expected for an unloaded coil are unmarked. As shown in FIG. 4, coils C1, C2, C7, C8, C13, and C14 in a first region of the wireless power transmitting device may have inductance measurements larger than expected for an unloaded coil. Coils C22, C23, C28, and C29 may also have inductance measurements larger than expected for an unloaded coil in a second region of the wireless power transmitting device.

To identify foreign objects, control circuitry (e.g., control circuitry 16 in FIG. 1) may identify segments in the inductance measurements from coils 42. In the example of FIG. 4, coils C1, C2, C7, C8, C13, and C14 have inductance measurements larger than expected for an unloaded coil and are grouped together on the charging surface. Control circuitry 16 may therefore identify a segment 82 that includes coils C1, C2, C7, C8, C13, and C14. Similarly, coils C22, C23, C28, and C29 have inductance measurements larger than expected for an unloaded coil and are grouped together on the charging surface. Control circuitry 16 may therefore identify a segment 84 that includes coils C22, C23, C28, and C29.

Control circuitry 16 may also receive a device-identifier from each wireless power receiving device on the charging surface (e.g., using in-band communication). To determine whether or not a foreign object is present, the control circuitry may compare the number of identified segments to the number of received device-identifiers. If the number of identified segments matches the number of received device-identifiers, control circuitry 16 may interpret that no foreign objects are present. If the number of identified segments does not match the number of received device-identifiers, control circuitry 16 may interpret that a foreign object is present. In the example of FIG. 4, control circuitry 16 may receive a first device-identifier from a cellular telephone and a second device-identifier from a watch. Control circuitry 16 may determine that the number of received device-identifiers (2) is equal to the number of identified segments (2) and conclude that no foreign objects are present. When the wireless power receiving device is not capable of sending an identifier to the wireless power transmitter device, the control circuitry 16 may try image-processing based foreign object detection based on the information associated with all supported wireless power receiving devices when identifying segments of the charging surface such as segments 82 and 84.

Control circuitry 16 may use information associated with the received device-identifiers when identifying segments of the charging surface such as segments 82 and 84. For example, each supported wireless power receiving device (and corresponding device-identifier) may have a known characteristic pattern of coil inductance measurements. In the example of FIG. 4, control circuitry 16 receives a device-identifier from a cellular telephone. The cellular telephone may have an associated characteristic pattern of coil inductance measurements. In response to receiving the device-identifier from the cellular telephone, control circuitry 16 of wireless power transmitting device 12 may look up the characteristic pattern associated with the cellular telephone. Control circuitry 16 may then compare the characteristic pattern associated with the cellular telephone to the inductance measurements from coils 42 in attempt to identify a segment that matches the characteristic pattern. For example, in FIG. 4, segment 82 may match the characteristic pattern associated with the cellular telephone present on the charging surface. Segment 84 may match a characteristic pattern associated with the watch present on the charging surface.

The characteristic patterns of the supported wireless power receiving devices may be characteristic patterns of coils with inductance measurements greater than expected for an unloaded coil that is expected when the supported wireless power receiving device is present on the charging surface (e.g., a cellular telephone may typically have an associated 2×3 segment of coils with inductance measurements greater than expected for an unloaded coil). The characteristic pattern may include additional information regarding inductance measurements associated with the presence of the cellular telephone on the charging surface (i.e., a maximum number of total coils with inductance measurements greater than expected for an unloaded coil, a maximum length of coils with inductance measurements greater than expected for an unloaded coil, a maximum width of coils with inductance measurements greater than expected for an unloaded coil, a maximum span of coils with inductance measurements greater than expected for an unloaded coil, other characterizing of shapes of coils with inductance measurements greater than expected for an unloaded coil, other variables dependent upon inductance and/or quality factor, etc.). The characteristic pattern (sometimes referred to as a template) may include information associated with expected inductance magnitudes (not simply whether or not the measured inductance is greater than expected for an unloaded coil). The characteristic pattern has been described as including information associated with coil inductances. However, the characteristic pattern may include quality factors, coupling coefficients, or other desired values that may be associated with the presence of the cellular telephone.

In the example of FIG. 5, a foreign object is present on wireless power transmitting device 12. As discussed in connection with FIG. 4, to identify foreign objects, control circuitry (e.g., control circuitry 16 in FIG. 1) may identify segments in the inductance measurements from coils 42. In the example of FIG. 5, coils C1, C2, C7, C8, C13, and C14 have inductance measurements larger than expected for an unloaded coil and are grouped together on the charging surface. Control circuitry 16 may therefore identify a segment 86 that includes coils C1, C2, C7, C8, C13, and C14. Coils C22, C23, C28, and C29 have inductance measurements larger than expected for an unloaded coil and are grouped together on the charging surface. Control circuitry 16 may therefore identify a segment 88 that includes coils C22, C23, C28, and C29. Finally coil C11 may have an inductance measurement larger than expected for an unloaded coil. Control circuitry 16 may therefore identify a segment 90 that includes coil C11.

In the example of FIG. 5, control circuitry 16 may receive a first device-identifier from a cellular telephone and a second device-identifier from a watch. Control circuitry 16 may determine that the number of received device-identifiers (2) is less than the number of identified segments (3) and conclude that a foreign object is present.

Figure 6:
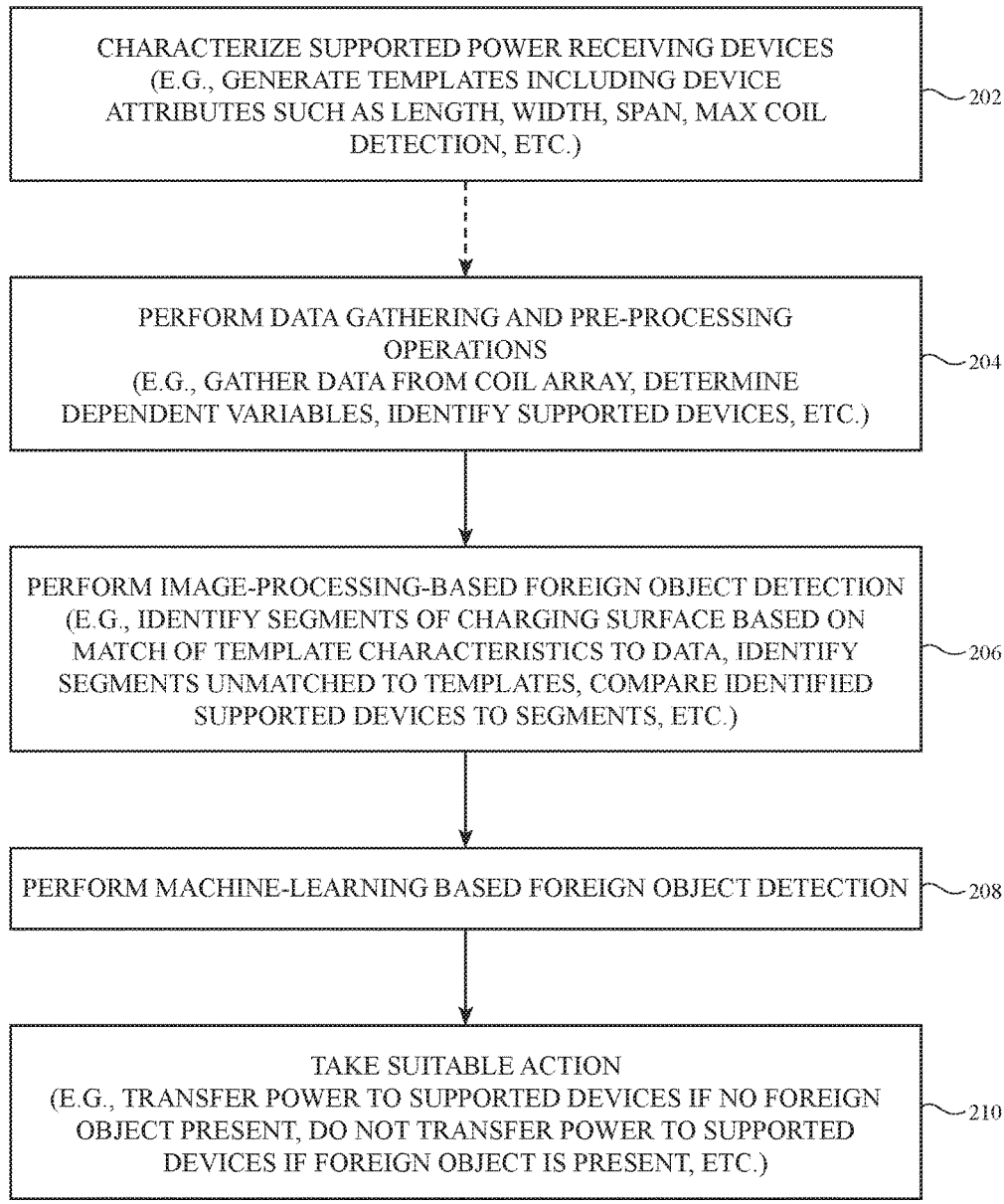
FIG. 6 is a flow chart of illustrative operations involved in operating a wireless power transmission system in accordance with an embodiment.

FIG. 6 is a flow chart of illustrative operations involved in using charging system 8.

During the operations of block 202, templates may be generated for supported power receiving devices. For each supported wireless receiving device, a number of trials may be performed. In each trial, data including inductance values, quality factors, and coupling factors may be gathered from the coil array of wireless power transmitting device 12. Data may be gathered from each coil in the coil array during each trial. During each trial, a wireless power receiving device may be present on the wireless power transmitting device (without a foreign object also present on the wireless power transmitting device). After each trial, the wireless power receiving device may be moved to a different position on the wireless power transmitting device. By characterizing the response of the coils in the coil array when the supported wireless power receiving device is present on the power transmitting device in different positions, orientations, and/or heights, a template or characteristic pattern may be developed for the supported wireless power receiving device.

The template for each supported wireless power receiving device may include typical inductance measurements from the coils in the coil array when the power receiving device is present on the charging surface of the power transmitting device. For example, the template may include information regarding a maximum number of total coils with inductance measurements greater than expected for an unloaded coil when the power receiving device is present, a maximum length of coils with inductance measurements greater than expected for an unloaded coil when the power receiving device is present, a maximum width of coils with inductance measurements greater than expected for an unloaded coil when the power receiving device is present, a maximum span of coils with inductance measurements greater than expected for an unloaded coil when the power receiving device is present, a minimum number of total coils with inductance measurements greater than expected for an unloaded coil when the power receiving device is present, a minimum length of coils with inductance measurements greater than expected for an unloaded coil when the power receiving device is present, a minimum width of coils with inductance measurements greater than expected for an unloaded coil when the power receiving device is present, and/or a minimum span of coils with inductance measurements greater than expected for an unloaded coil when the power receiving device is present. During operation of wireless power transmitting device 12, the templates may be compared to coil data from the coil array to determine if a supported wireless power receiving device is present.

During the operations of block 204, power transmitting device 12 may perform data gathering operations. Signal measurement circuitry 41 in wireless power transmitting device 12 may apply an excitation signal (e.g., an impulse) to each coil 42 in the array of wireless power transmitting coils in device 12. As each impulse is applied to the output circuit associated with a respective coil 42, signal measurement circuitry 41 determines parameters such as coil inductance L, quality factor Q, etc. Also during the operations of block 302, pre-processing operations may be performed such as determining relevant dependent variables (i.e., $L^2$, $L \times Q$, $L^2 \times Q$, etc.).

Also during the operations of block 204, power transmitting device 12 may identify supported wireless power receiving devices 24 present on the charging surface. Power receiving devices 24 on the wireless power transmitting device may wirelessly transmit data including a device-identifier to power transmitting device 12. The device-identifier may identify what type of device wireless power receiving device 24 is (i.e., a cellular telephone, a watch, a tablet, etc.). Power receiving devices 24 may wirelessly transmit additional information to wireless power transmitting device 12 (i.e., charge levels, coil inductances, other device statuses, etc.). As previously discussed, power transmitting device 12 and power receiving device 24 may wirelessly communicate using in-band communication. With one illustrative configuration, frequency-shift keying (FSK) is used to convey in-band data from device 12 to device 24 and amplitude-shift keying (ASK) is used to convey in-band data from device 24 to device 12.

In-band communications from power receiving device 24 to power transmitting device 12 (i.e., communications including a device-identifier) may use ASK modulation and demodulation techniques. Wireless transceiver circuitry 46 may transmit the device-identifier in-band to device 12 by using a switch (e.g., one or more transistors in transceiver 46 that are coupled coil 48) to modulate the impedance of power receiving circuitry 54 (e.g., coil 48). This, in turn, modulates the amplitude of signal 44 and the amplitude of the AC signal passing through coil(s) 42. Wireless transceiver circuitry 40 monitors the amplitude of the AC signal passing through coil(s) 42 and, using ASK demodulation, extracts the transmitted device-identifier from these signals that were transmitted by wireless transceiver circuitry 46.

During the operations of block 206, control circuitry 16 of power transmitting device 12 may perform image-processing-based foreign object detection. In image-processing-based foreign object detection, the measurements (e.g., inductance measurements L and quality factors Q) from each coil in the array as well as the received device-identifiers from each supported wireless power receiving device on the charging surface may be examined. The measurements from the coil array may be divided into segments using templates (with characteristics as described above in connection with the operations of block 202). Segments may include groups of adjacent coils with inductance values different (e.g., greater) than expected for an unloaded coil. The segments may be identified at least in part based on comparisons between the inductance measurements from the array of coils and known characteristic patterns (i.e., templates) of inductance measurements associated with the received device-identifiers. The characteristic patterns of inductance measurements may be stored in wireless power transmitting device 12 (e.g., in a lookup table). In response to receiving a device-identifier from a wireless power receiving device, control circuitry 16 in wireless power transmitting device 12 may retrieve the characteristic pattern associated with the device-identifier (e.g., from the lookup table).

To determine whether or not a foreign object is present, the control circuitry may compare the number of identified segments to the number of received device-identifiers. If the number of identified segments matches the number of received device-identifiers, control circuitry 16 may interpret that no foreign objects are present. If the number of identified segments does not match the number of received device-identifiers, control circuitry 16 may interpret that a foreign object is present. For example, if a segment (corresponding to a conductive object) is detected that does not have a corresponding device-identifier, it can be assumed the segment corresponds to a foreign object (i.e., a metallic object such as a coin, key, or paper clip).

During the operations of block 208, control circuitry 16 of power transmitting device 12 may perform machine-learning-based foreign object detection. A machine learning classifier may be used to determine a probability value indicative of whether a foreign object is present (which is tied to a probability value indicative of whether only one or more wireless power receiving devices are present). The machine learning classifier may receive data such as inductance measurements and quality factors, dependent variables (i.e., $L^2$, $L \times Q$, $L^2 \times Q$, etc.), and the received device-identifiers as input. Based on the input, the machine learning classifier may determine a probability value indicative of whether a foreign object is present on the charging surface of device 12. The machine learning classifier may instead or in addition determine a probability value indicative of whether only supported wireless power receiving devices are present on the charging surface (i.e., the probability of no foreign objects being present).

During the operations of block 210, control circuitry 16 of power transmitting device 12 may take suitable action in response to the findings of the image-processing-based foreign object detection and the machine-learning-based foreign object detection. For example, if a foreign object is detected during the operations of block 206, control circuitry 16 may cause wireless power transmitting circuitry 52 to forgo transmitting wireless power signals with coils 42. If no foreign objects are detected during the operations of block 206, control circuitry 16 may then perform the operations of block 208 or may cause wireless power transmitting circuitry 52 to transmit wireless power signals with coils 42.

Control circuitry 16 of power transmitting device 12 may compare the probability value (i.e., the probability of a foreign object being present) from the machine learning classifier to a predetermined threshold. If the probability value exceeds the threshold (indicating a foreign object is likely present), control circuitry 16 may cause wireless power transmitting circuitry 52 to forgo transmitting wireless power signals with coils 42. In contrast, if the probability value is less than the threshold (indicating a foreign object is likely not present), control circuitry 16 may cause wireless power transmitting circuitry 52 to transmit wireless power signals with one or more coils 42.

In certain embodiments where power transmitting device 12 includes more than one coil 42, only a subset of coils 42 may transfer wireless power signals. Different coils may transfer different amounts of wireless power if desired. In some embodiments, a foreign object may be detected but determined to be far enough away from a wireless power receiving device to enable wireless power transfer without heating the foreign object. In these embodiments, wireless power may be transferred to a wireless power receiving device (even though a foreign object is present on the charging surface)

In some embodiments, when a foreign object is determined to likely be present, control circuitry 16 may generate an alert that notifies a user that the foreign object is present. The alert may be, for example, a visual alert displayed on power receiving device 24 or an auditory alert emitted by power receiving device 24. For example, power transmitting device 12 may convey the alert to power receiving device 24 using in-band communication. Power receiving device 24 may then display a visual alert using a display, emit an auditory alert using a speaker, or convey a haptic alert using a haptic output device (e.g., a vibrator). Power receiving device 24 may convey the alert using any desired component (i.e., input-output devices 56 such as a display or audio components). Alternatively, power transmitting device 12 may include input-output components (i.e., a display or audio component) that are used to convey the alert to the user. In general, any desired action may be taken during operations of block 210.

The foregoing is merely illustrative and various modifications can be made to the described embodiments. The foregoing embodiments may be implemented individually or in any combination.

What is claimed is:

1. A wireless power transmitting device with a charging surface configured to receive at least one wireless power receiving device, the wireless power transmitting device comprising:

a plurality of coils;

wireless power transmitting circuitry coupled to the plurality of coils and configured to transmit wireless power signals with the plurality of coils; and control circuitry configured to:
gather first measurements using the plurality of coils, wherein the first measurements comprise data communication signals;
demodulate at least portions of the first measurements into data communication bits;
determine, using the data communication bits, a first number of wireless power receiving devices that are coupled with the plurality of coils;
gather second measurements using the plurality of coils, wherein the second measurements comprise one or more measurements selected from the group consisting of: inductance measurements, quality factor measurements, and coupling factor measurements;
determine, using the second measurements, a second number of potential wireless power receiving devices that are coupled with the plurality of coils; and
control transmission of wireless power using the wireless power transmitting circuitry based at least on the first number and the second number.

2. The wireless power transmitting device of claim 1, wherein controlling transmission of wireless power comprises:
in accordance with a determination that the first number equals the second number, causing the wireless power transmitting circuitry to transmit wireless power signals with one or more coils of the plurality of coils.

3. The wireless power transmitting device of claim 1, wherein controlling transmission of wireless power comprises:
in accordance with a determination that the first number is less than the second number, causing the wireless power transmitting circuitry to forgo transmitting wireless power signals with one or more coils of the plurality of coils.

4. The wireless power transmitting device of claim 3, wherein the control circuitry is further configured to:
in accordance with the determination that the first number is less than the second number, cause an alert, wherein the alert comprises an alert selected from the group consisting of: a haptic alert, a visual alert and an auditory alert.

5. The wireless power transmitting device of claim 1, wherein determining the first number of wireless power receiving devices that are coupled with the plurality of coils comprises counting a number of in-band communication transceivers that are coupled with the plurality of coils.

6. The wireless power transmitting device of claim 1, wherein demodulating at least portions of the first measurements into data communication bits comprises demodulating amplitude-shift keying or frequency-shift keying signals.

7. The wireless power transmitting device of claim 1, wherein the control circuitry is further configured to determine, using the second measurements, a probability value indicative of whether a predetermined wireless power receiving device is present on the charging surface.

8. The wireless power transmitting device of claim 1, wherein determining, using the data communication bits, the first number of wireless power receiving devices that are coupled with the plurality of coils comprises using the data communication bits to identify a device-identifier from each wireless power receiving device present on the charging surface.

9. The wireless power transmitting device of claim 8, wherein determining, using the second measurements, the second number of potential wireless power receiving devices that are coupled with the plurality of coils comprises:
obtaining a plurality of characteristic patterns of coil inductance measurements representing potential wireless power receiving devices based on the identified device-identifiers; and
determining the second number of potential wireless power receiving devices that are coupled with the plurality of coils using the obtained characteristic patterns and the second measurements.

10. The wireless power transmitting device of claim 1, wherein the second measurements include one or more inductance measurements, one or more quality factor measurements, and one or more coupling factor measurements.

11. The wireless power transmitting device of claim 1, further comprising signal measurement circuitry configured to provide an excitation signal to each coil in the plurality of coils to gather the second measurements.

12. A wireless power transmitting device with a charging surface configured to receive at least one wireless power receiving device, the wireless power transmitting device comprising:
a plurality of coils;
wireless power transmitting circuitry coupled to the plurality of coils and configured to transmit wireless power signals with the plurality of coils; and
control circuitry configured to:
count a first number of wireless power receiving devices present on the charging surface;
gather data from the plurality of coils;
process the data to identify a second number of regions on the charging surface that correspond to potential wireless power receiving devices;
compare the first number to the second number; and
control transmission of wireless power using the wireless power transmitting circuitry based at least on the comparison between the first number and the second number.

13. The wireless power transmitting device of claim 12, wherein controlling transmission of wireless power using the wireless power transmitting circuitry based at least on the comparison between the first number and the second number comprises:
in response to determining that the first number is less than the second number, directing the wireless power transmitting circuitry to forgo transmitting wireless power signals.

14. The wireless power transmitting device of claim 12, wherein the control circuitry is further configured to:
in response to determining that the first number is less than the second number, generate an alert that indicates that a foreign object is present.

15. The wireless power transmitting device of claim 12, wherein the control circuitry includes signal measurement circuitry that is configured to gather inductance measurements from the plurality of coils by providing an excitation signal to each coil in the plurality of coils.

16. The wireless power transmitting device of claim 15, wherein counting the first number of wireless power receiving devices present on the charging surface comprises wirelessly receiving a device-identifier from each wireless power receiving device present on the charging surface.

17. The wireless power transmitting device of claim 16, wherein processing the data to identify the second number of regions on the charging surface that correspond to potential wireless power receiving devices comprises:
obtaining template characteristics for each wireless power receiving device based on the received device-identifier from each wireless power receiving device; and
applying the template characteristics to the data to identify the second number of regions on the charging surface that correspond to potential wireless power receiving devices.

18. A wireless power transmitting device with a charging surface configured to receive at least one wireless power receiving device, the wireless power transmitting device comprising:
a plurality of coils;
wireless power transmitting circuitry coupled to the plurality of coils and configured to transmit wireless power signals with the plurality of coils; and
control circuitry configured to:
determine a numeric value indicative of how many wireless power receiving devices are present on the charging surface;
gather data from the plurality of coils;
based on the data from the plurality of coils, divide the charging surface into a plurality of segments that each correspond to a potential wireless power receiving device;
compare the numeric value indicative of how many wireless power receiving devices are present on the charging surface to a count of the plurality of segments; and
control transmission of wireless power using the wireless power transmitting circuitry based at least on the comparison between the numeric value indicative of how many wireless power receiving devices are present on the charging surface and the count of the plurality of segments.

19. The wireless power transmitting device of claim 18, wherein determining the numeric value indicative of how many wireless power receiving devices are present on the charging surface comprises wirelessly receiving a device-identifier from each wireless power receiving device present on the charging surface and wherein dividing the charging surface into the plurality of segments that each correspond to a potential wireless power receiving device comprises applying template characteristics associated with each device-identifier to the data from the plurality of coils to divide the charging surface into the plurality of segments.

20. The wireless power transmitting device of claim 18, wherein controlling transmission of wireless power using the wireless power transmitting circuitry based at least on the comparison between the numeric value indicative of how many wireless power receiving devices are present on the charging surface and the count of the plurality of segments comprises:
in response to determining that the numeric value indicative of how many wireless power receiving devices are present on the charging surface is less than the count of the plurality of segments, directing the wireless power transmitting circuitry to forgo transmitting wireless power signals.

* * * * *